US012253416B2

(12) United States Patent
Van Laere

(10) Patent No.: US 12,253,416 B2
(45) Date of Patent: Mar. 18, 2025

(54) THERMAL IMAGING SENSORS THAT CONNECT TO EACH OTHER USING A WIRED DAISY CHAIN CONNECTION

(71) Applicant: Maarten P. J. Van Laere, Leuven (BE)

(72) Inventor: Maarten P. J. Van Laere, Leuven (BE)

(73) Assignee: ALPINCO BV, Zaventem (BE)

( * ) Notice: Subject to any disclaimer, the term of this patent is extended or adjusted under 35 U.S.C. 154(b) by 217 days.

(21) Appl. No.: 18/111,566

(22) Filed: Feb. 18, 2023

(65) Prior Publication Data

US 2023/0296441 A1    Sep. 21, 2023

Related U.S. Application Data

(60) Provisional application No. 63/314,230, filed on Feb. 25, 2022.

(51) Int. Cl.
*G01J 5/02*       (2022.01)
*G01J 5/00*       (2022.01)
*H04N 5/33*       (2023.01)

(52) U.S. Cl.
CPC ............. *G01J 5/0205* (2013.01); *H04N 5/33* (2013.01); *G01J 2005/0077* (2013.01)

(58) Field of Classification Search
CPC .. G01J 5/0205; G01J 2005/0077; G01J 5/025; H04N 5/33; H04N 23/23; H04L 12/10; H04L 12/42; G06F 13/4247
See application file for complete search history.

(56) References Cited

U.S. PATENT DOCUMENTS

2017/0155851 A1 * 6/2017 Van Laere ............. H04N 23/23
2021/0232117 A1 * 7/2021 Van Laere ........... G05B 19/406

FOREIGN PATENT DOCUMENTS

JP              2003124947      *  4/2003  ............. H04L 12/28

* cited by examiner

*Primary Examiner* — David P Porta
*Assistant Examiner* — Meenakshi S Sahu
(74) *Attorney, Agent, or Firm* — White-Welker & Welker, LLC; Matthew T. Welker, Esq.

(57) ABSTRACT

A new innovative way for connecting multiple thermal imaging sensors to a base unit while only using one port of the base unit when connected to such a base unit; this by using a daisy chained connection between the sensors themselves. The thermal imaging sensor(s) connect to each other using a wired connectivity with or without being connected directly or indirectly to a base unit. The thermal imaging sensor in this invention is not a single standalone unit but consists of at least 2 physical different devices that are connected to each other using a wired connection.

23 Claims, 1 Drawing Sheet

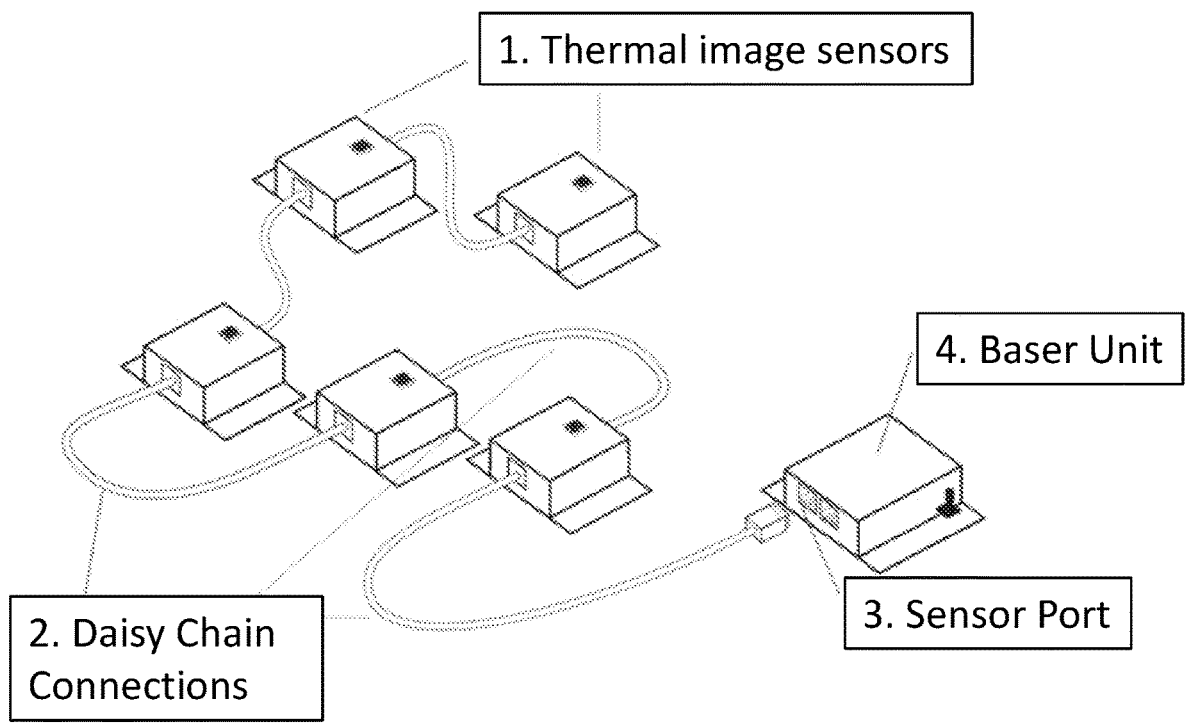

THERMAL IMAGING SENSORS THAT CONNECT TO EACH OTHER USING A WIRED DAISY CHAIN CONNECTION

FEDERALLY SPONSORED RESEARCH

Not Applicable

SEQUENCE LISTING OR PROGRAM

Not Applicable

TECHNICAL FIELD OF THE PRESENT INVENTION

The present invention relates generally to a new kind of connectivity for thermal imaging sensors. The invention enables multiple thermal imaging sensors to connect to each other using a wired connection in a daisy chain type of connection. They may or may not at some point of the daisy connection be directly or indirectly connected to a base unit.

BACKGROUND OF THE PRESENT INVENTION

Until now when multiple thermal image sensors are wired, then they are connected in a star shaped concept where each thermal imaging sensor individually wires to a base unit or a device connected to a base unit. This has some disadvantages. One main disadvantage is that each thermal imaging sensor would require a port on the base unit to connect to, limiting the number of thermal imaging sensor that can be connected to such a base unit. A second disadvantage is that in terms of cabling each sensor would need to run a cable back to a base unit making deployments more complex and more expensive.

SUMMARY OF THE INVENTION

The invention generally relates to thermal imaging sensors that are wired to each other in a daisy chain type of connection. Typically, but not limited to, this enables thermal imaging sensors to have multiple sensors connected to each other whilst connecting to one port of a base unit. In electrical and electronic engineering, a daisy chain refers to a wiring scheme in which multiple devices are wired together in sequence or in a ring.

There has thus been outlined, rather broadly, some of the features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

Usually when using wired connections, each sensor connects to an available port of a base unit or an expansion unit thereof. As a result of this, the number of thermal imaging sensors that can be connected to a base unit is therefore limited to the number of sensor ports available. An object is to provide a new kind of wiring thermal imaging sensors to each other that enables to wire to a base unit on or fewer ports on the base unit, or to another device between the sensor daisy chain wiring string and base unit. This enables the increase of the number of sensors that could otherwise be connected to the physical ports that are available on a base unit.

Another object of this invention is whereby multiple thermal imaging sensors are connected to each other on a string without connecting to a base unit. Following is a non-limitative example: a daisy chain connectivity could be useful to share power across all connected sensors and with each sensor having its own outbound IP or non-IP based connectivity. This removes the need in this example for a base unit.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of this application.

BRIEF DESCRIPTION OF THE DRAWINGS

The accompanying drawings, which are incorporated herein and form a part of the specification, illustrate the present invention and, together with the description, further serve to explain the principles of the present invention and to enable a person skilled in the pertinent art to make and use the present invention.

Various other objects, features and attendant advantages of the present invention will become fully appreciated as the same becomes better understood when considered in conjunction with the accompanying drawings, in which like reference characters designate the same or similar parts throughout the several views, and wherein:

FIG. 1 is a drawing of a possible operation of the present invention. Operation of the thermal imaging sensors that connect to each other using a wired connection in a daisy chain type of connectivity. In its turn the sensors then connect to a base unit.

INDEX OF ELEMENTS

1: Thermal Imaging Camera Sensor
2: Daisy Chain Connection
3: Port
4: Base Unit

DETAILED DESCRIPTION OF THE PRESENT INVENTION

In the following detailed description of the present invention of exemplary embodiments of the present invention, reference is made to the accompanying drawings (where like numbers represent like elements), which form a part hereof, and in which is shown by way of illustration specific exemplary embodiments in which the present invention may be practiced. These embodiments are described in sufficient detail to enable those skilled in the art to practice the present invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the present invention. However, it is understood that the present invention may be practiced without these specific details. In other instances, well-known structures and techniques known to one of ordinary skill in the art have not been shown in detail in order not to obscure the present invention. Referring to the figures, it is possible to see the various major elements constituting the apparatus of the present invention.

A. Overview

Turning now descriptively to the drawings, in which similar reference characters denote similar elements throughout the several views, the figures illustrate multiple thermal imaging sensors that are connected to a base unit in a daisy chained wiring type of connection.

B. Thermal Imaging Camera Sensors

The thermal imaging sensor consists of one or more thermal imaging cameras.

C. Wired Connection

The thermal imaging sensor connects to other thermal imaging sensor using a sequential wired connection creating a daisy chain of sensors. This sequence wiring can be looped back at the end of the string to form a ring.

In electrical and electronic engineering, a daisy chain is a wiring scheme in which multiple devices are wired together in sequence or in a ring. A ring is whereby a daisy chained wiring loops back to the first device in the chain. A daisy chained connection can be looped or not.

The daisy chained sensors can be all thermal imaging sensors or could be mixed with sensors of another type in a daisy chain, or one or more other non-sensor type of devices connected on the same daisy chain connection string.

The wired connection may transmit data only, power only or may transmit data and power across its cable to which the different sensors are connected to each other.

D. Base Unit and Sensor Port

The base unit is a device acting as the logical unit and that in turn connects to other systems directly or indirectly.

The base unit has one or more ports to which one or more sensors can connect to. In other embodiments in this invention, sensors may first connect to one or more devices which in turn are then directly or indirectly connected to a base unit.

In another embodiment, the sensors may use more than one port to connect to. For example, but not limited to this example, this could be required to increase the amount of power sent to the sensors when power on a single port is too limited for the daisy chain to work as intended.

The role of a base unit may be as a separate physical device as per FIG. 1, or the base unit may be combined with the features of a thermal imaging sensor within one and the same physical device.

E. Connections of Main Elements and Sub-Elements of Invention

A typical implementation of this invention would be a sensor device that includes the features as described in the first element. This sensor device would then connect to another sensor device of the same type of sensor or another type, which in turn then connects to a base unit.

On a daisy chain wiring string there could be multiple sensors of the same or different types, as well as other non-sensor type of devices. Such devices could be, but not limited to, devices like signal control and routing devices.

The base (logical) unit connects to the IP network and makes the data available via IP network or serial protocols to applications and other systems.

As previously explained, the base unit could be a separate physical device of the sensor (thermal imaging or of any other type) or could be a feature of a sensor (thermal imaging or of any other type).

The daisy chained thermal imaging sensors could also connect a base unit that is not connected to an IP network.

F. Operation of Preferred Embodiment

The invention is for a thermal imaging sensor that connects to one or more thermal imaging sensors using a daisy chained wired connection. In turn it is then connected to one or more base units. In a typical embodiment there would only be one base unit but specific use cases of this invention could require multiple base units on a daisy string connection of thermal imaging sensors.

In a traditional way of connecting sensors, one would need to connect each sensor to a port of at least one base unit or any type of device between the sensors and one or more base units. By using a daisy chained wiring connection from one thermal imaging sensor to the other, one can have multiple sensors connected to just one sensor port on a base unit or port on a device in between the sensors and a base unit like, but not limited to, a sensor hub.

In another embodiment of the invention, the thermal imaging sensors could be all directly or indirectly connected to each other without connecting to a base unit. For example, the wiring cable connecting all units together in sequence would transmit power across all connected sensors and devices with each having its own IP or non-IP based connectivity to other systems. What has been described and illustrated herein is a preferred embodiment of the present invention along with some of its variations. The terms, descriptions and figures used herein are set forth by way of illustration only and are not meant as limitations. Those skilled in the art will recognize that many variations are possible within the spirit and scope of the present invention in which all terms are meant in their broadest, reasonable sense unless otherwise indicated. Any headings utilized within the description are for convenience only and have no legal or limiting effect.

Thus, it is appreciated that the optimum dimensional relationships for the parts of the present invention, to include variation in size, materials, shape, form, function, and manner of operation, assembly, and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the present invention should be determined by the appended claims and their legal equivalents, rather than by the examples given.

The embodiments of the present invention in which an exclusive property or privilege is claimed are defined as follows:

1. A plurality of thermal imaging sensors that connect to each other using a wired daisy chain connection, the device comprising:
   a plurality of thermal imaging camera sensors;
   a base unit;
   a pair of ports on each of the thermal imaging camera sensors and the base unit; and
   a daisy chain connection between a plurality of thermal image sensors and a base unit.

2. The device of claim 1, wherein multiple thermal imaging sensors are connected to a base unit in a daisy chained wiring type of connection.

3. The device of claim 1, wherein the thermal imaging sensor consists of one or more thermal imaging cameras.

4. The device of claim 1, wherein
   a thermal imaging sensor connects to another thermal imaging sensor using a sequential wired connection creating a daisy chain of sensors until a base unit is reached.

5. The device of claim 4, wherein
   the sequence of wiring loops back at the end of the string to form a ring from the base unit to the first thermal image sensor in the chain.

6. The device of claim 1, wherein
   the daisy chained sensors are all thermal imaging sensors.

7. The device of claim 1, wherein
   the daisy chained sensors are thermal imaging sensors mixed with sensors of another type in a daisy chain.

8. The device of claim 1, wherein
   the daisy chained sensors are thermal imaging sensors mixed with one or more other non-sensor type of devices connected on the same daisy chain connection string.

9. The device of claim 7, wherein
   the wired connection transmits data only, power only, or may transmit data and power across its cable to which the different sensors are connected to each other.

10. The device of claim 1, wherein
    the base unit is a device acting as the logical unit and that in turns connects to other systems directly or indirectly.

11. The device of claim 1, wherein
    the base unit has one or more ports to which one or more sensors can connect to.

12. The device of claim 10, wherein
    sensors may first connect to one or more devices which in turn are then directly or indirectly connected to a base unit.

13. The device of claim 1, wherein
    the sensors use more than one port to connect to.

14. The device of claim 1, wherein
    the role of a base unit is as a separate physical device.

15. The device of claim 1, wherein
    the role of a base unit is combined with the features of a thermal imaging sensor within one and the same physical device.

16. The device of claim 1, wherein
    a first sensor device connects to another sensor device of the same type of sensor or another type, which in turn then connects to a base unit.

17. The device of claim 1, wherein
    on a daisy chain wiring string there are multiple sensors of the same or different types, as well as other non-sensor type of devices; and
    the devices are signal control and routing devices.

18. The device of claim 1, wherein
    the base (logical) unit connects to an IP network and makes the data available via IP network or serial protocols to applications and other systems.

19. The device of claim 1, wherein
    a thermal imaging sensor connects to one or more thermal imaging sensors using a daisy chained wired connection; and
    in turn the thermal imaging sensor is then connected to one or more base units.

20. The device of claim 1, wherein
    by using a daisy chained wiring connection from one thermal imaging sensor to the other, multiple sensors are connected to just one sensor port on a base unit or port on a device in between the sensors and a base unit.

21. The device of claim 17, wherein
    at least one the device is a sensor hub.

22. The device of claim 1, wherein
    the thermal imaging sensors are all directly or indirectly connected to each other without connecting to a base unit.

23. The device of claim 19, wherein
    the wiring cable connecting all units together in sequence transmits power across all connected sensors and devices with each having its own IP or non-IP based connectivity to other systems.

* * * * *